United States Patent
Wu

(10) Patent No.: US 6,435,539 B1
(45) Date of Patent: Aug. 20, 2002

(54) FOLDING COLLAPSIBLE GOLF CART

(76) Inventor: David Wu, No. 35-1, Jih Hsin Street, Tu Cheng, Taipei Hsien (TW)

( * ) Notice: Subject to any disclaimer, the term of this patent is extended or adjusted under 35 U.S.C. 154(b) by 70 days.

(21) Appl. No.: 09/722,468

(22) Filed: Nov. 28, 2000

(51) Int. Cl.[7] .............................................. B62B 1/04
(52) U.S. Cl. ...................... 280/652; 280/655; 280/42; 280/47.17; 280/47.315; 280/DIG. 6
(58) Field of Search ........................ 280/652, DIG. 5, 280/DIG. 6, 47.26, 655, 655.1, 38, 42, 645, 648, 47.17, 47.315; 224/274; 248/96; D34/15

(56) References Cited

U.S. PATENT DOCUMENTS

| | | | | |
|---|---|---|---|---|
| 4,784,401 A | * | 11/1988 | Raguet | 280/40 |
| 4,793,622 A | * | 12/1988 | Sydlow | 280/40 |
| 5,180,184 A | * | 1/1993 | Chiu | 280/646 |
| 5,857,684 A | * | 1/1999 | Liao et al. | 280/40 |
| 6,193,264 B1 | * | 2/2001 | Seon | 280/652 |
| 6,273,452 B1 | * | 8/2001 | Wu | 280/652 |
| 6,345,836 B1 | * | 2/2002 | Wu | 280/651 |

* cited by examiner

Primary Examiner—Brian L. Johnson
Assistant Examiner—J. Allen Shriver
(74) Attorney, Agent, or Firm—Varndell & Varndell, PLLC

(57) ABSTRACT

A folding collapsible golf cart includes a wheel shaft holding a first wheel holder and a second wheel holder, a coupling block mounted on the wheel shaft, a bottom main shaft pivoted to the coupling block and holding a lower golf bag cradle, a lower main shaft pivoted to the coupling block and holding an upper golf bag cradle, a frame bar connected between the coupling block and the first wheel holder to hold a carrying handle, an upper link coupled between the lower main shaft and the first wheel holder and holding an upper golf bag cradle, a lower link coupled between the bottom main shaft and the first wheel holder, an upper main shaft pivoted to the lower main shaft, a spring-supported locking frame mounted on the upper main shaft and hooked on teeth at the upper golf bag cradle, and a retractable front handle coupled to the upper main shaft. The upper link and the lower link are forced to move the coupling block and the carrying handle toward the second wheel holder and the bottom main shaft and the lower golf bag cradle toward the first wheel holder to simultaneously achieve X, Y, Z three-direction folding action when turning the upper main shaft downwards toward the lower main shaft after disengaging the locking frame from the teeth of the upper golf bag cradle.

3 Claims, 15 Drawing Sheets

FOLDING COLLAPSIBLE GOLF CART

BACKGROUND AND SUMMARY OF THE INVENTION

The present invention relates to a folding collapsible golf cart and, more particularly, to such a folding collapsible golf cart that can be conveniently carried by hand when collapsed.

Various golf carts are known folding collapsible. FIG. 1 shows a folding collapsible golf cart 9 according to the prior art. When turning the upper main shaft 92 backwards, the links 931 and 932 are pulled to move the wheel frames 96 and 97 and the wheels 981 and 982 toward the lower main shaft 99. When collapsed, this structure of golf cart still occupies much storage space. Further, the collapsed golf cart is inconvenient for carrying by hand. For easy carrying by hand, the collapsed golf cart must be put in a carrying bag or case. Similar folding collapsible structures with retractable handle means are seen in U.S. Pat. Nos. 5,249,822 and 5,288,099. These disclosures still cannot eliminate the aforesaid problem.

It is the main object of the present invention to provide a folding collapsible golf cart that can be conveniently carried by hand without the use of any carrying bag or rope when folded up. According to one aspect of the present invention, the folding collapsible golf cart comprises folding collapsible golf cart includes a wheel shaft holding a first wheel holder and a second wheel holder, a coupling block mounted on the wheel shaft, a bottom main shaft pivoted to the coupling block and holding a lower golf bag cradle, a lower main shaft pivoted to the coupling block and holding an upper golf bag cradle, a frame bar connected between the coupling block and the first wheel holder to hold a carrying handle, an upper link coupled between the lower main shaft and the first wheel holder and holding an upper golf bag cradle, a lower link coupled between the bottom main shaft and the first wheel holder, an upper main shaft pivoted to the lower main shaft, a spring-supported locking frame mounted on the upper main shaft and hooked on teeth at the upper golf bag cradle, and a retractable front handle coupled to the upper main shaft. According to another aspect of the present invention, the upper link and the lower link are forced to move the coupling block and the carrying handle toward the second wheel holder and the bottom main shaft and the lower golf bag cradle toward the first wheel holder to simultaneously achieve X, Y, Z three-direction folding action when turning the upper main shaft downwards toward the lower main shaft after disengaging the locking frame from the teeth of the upper golf bag cradle. According to still another aspect of the present invention, the front handle comprises hooked spring plates adapted for hooking on the lower main shaft to hold the golf cart in the collapsed position for enabling the user to carry the collapsed golf cart by hand. According to still another aspect of the present invention, the front handle has a clip adapted to hold down sheets of paper on the shank of the front handle.

DETAILED DESCRIPTION OF THE PREFERRED EMBODIMENT

Figure 1:
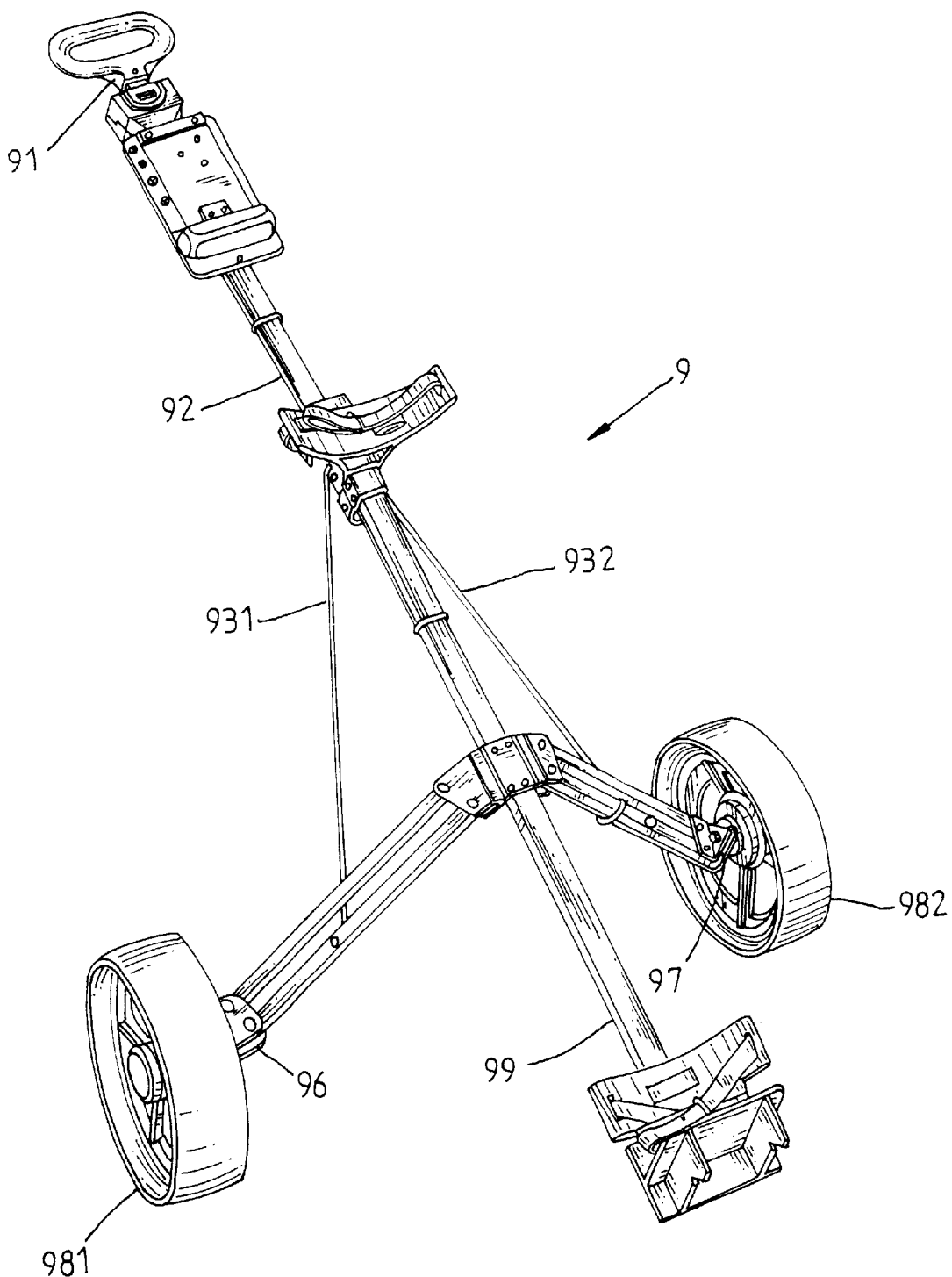
FIG. 1 is a perspective view of a folding collapsible golf cart according to the prior art.

Referring to FIGS. from 2 through 15, a folding collapsible golf cart in accordance with the present invention comprises a front handle 1, an upper main shaft 2, a locking frame 20, an upper golf bag cradle 31, a lower main shaft 4, an upper link 51, a coupling block 6, a wheel shaft 83, a frame bar 40, a carrying handle 7, a first wheel holder 81, a second wheel holder 82, a lower link 52, a bottom main shaft 80, and a lower golf bag cradle 32.

Figure 6:
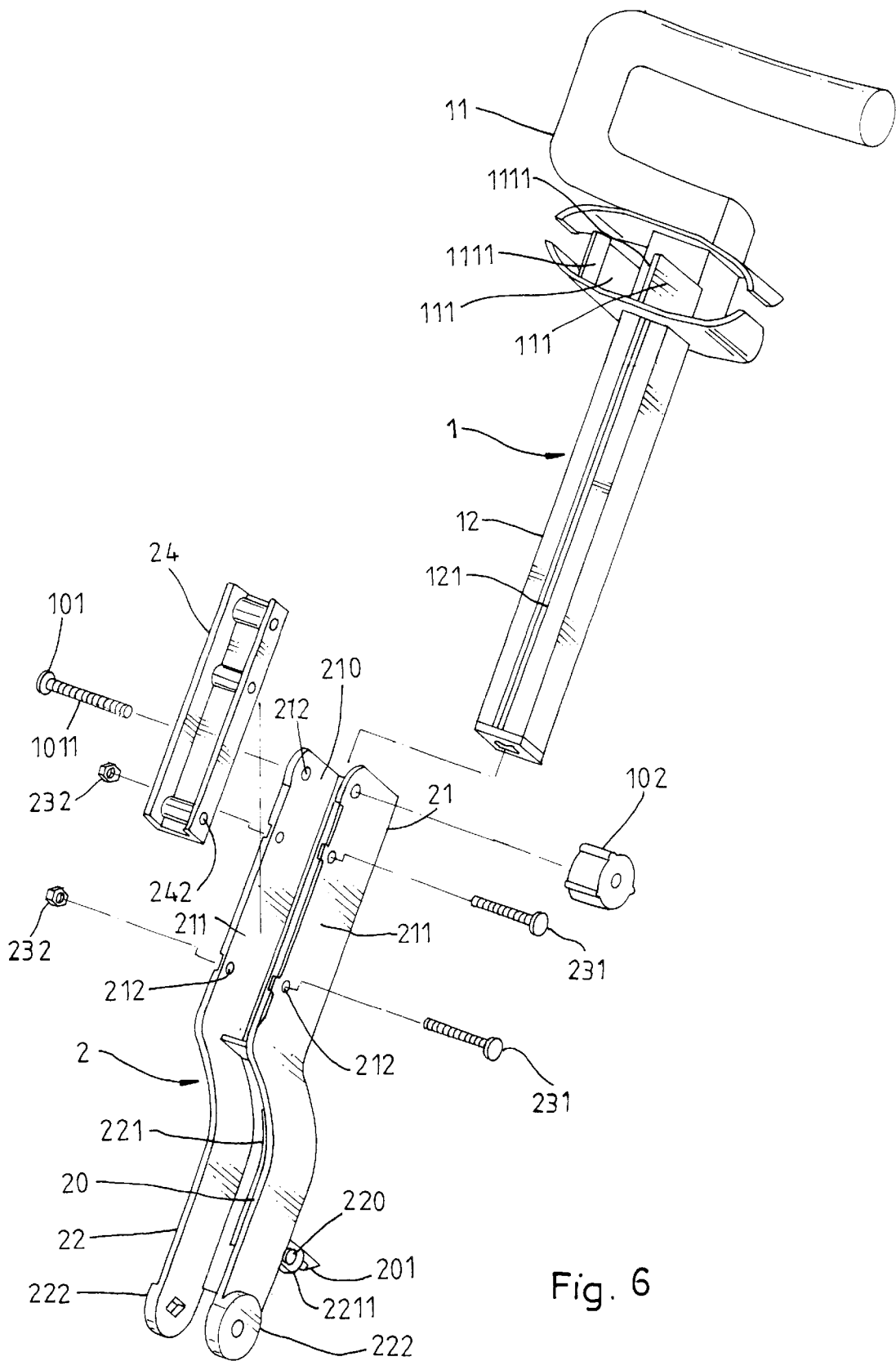
FIG. 6 is an exploded view of the upper main shaft and the handle according to the present invention.
Figure 7:
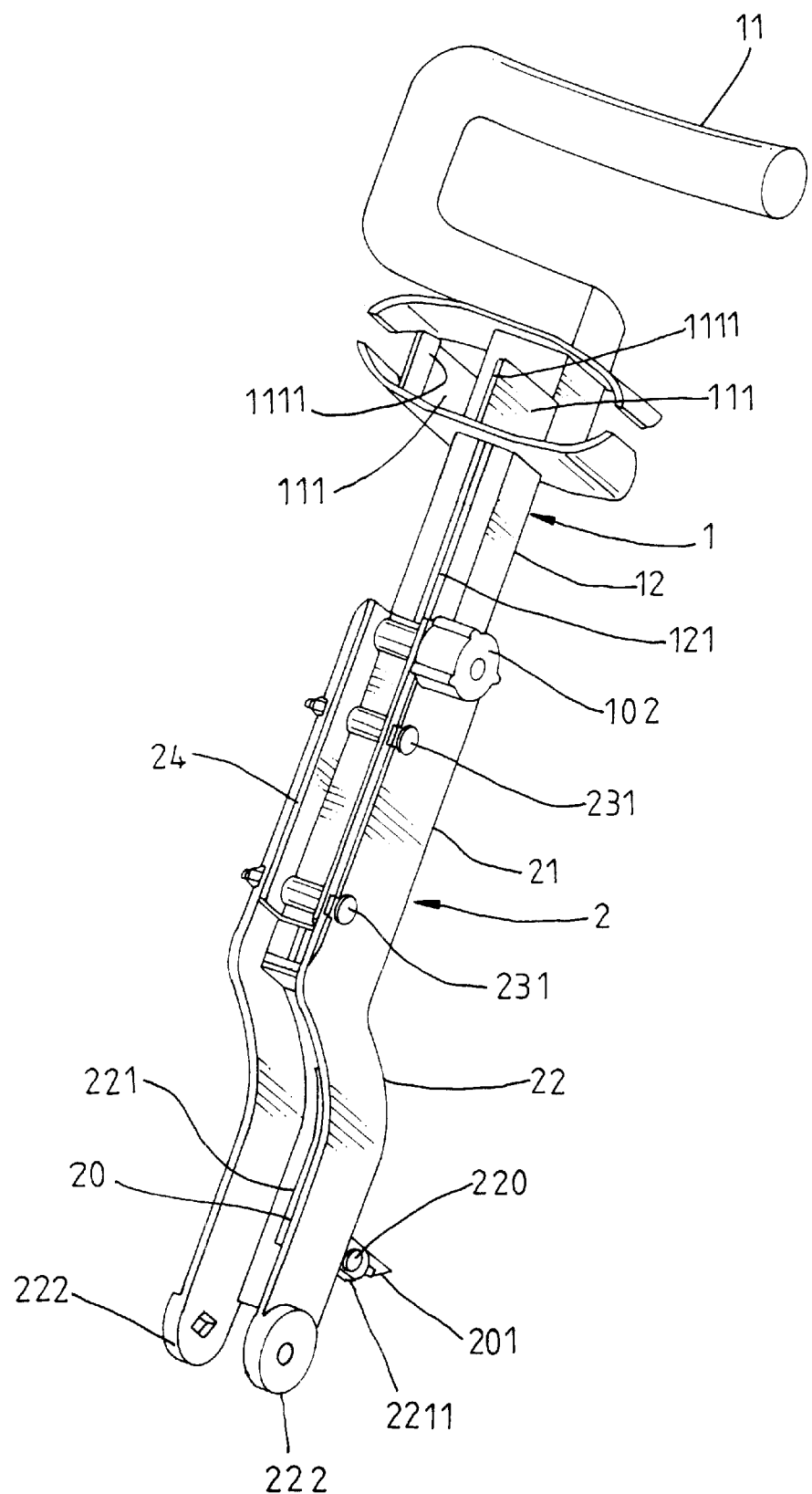
FIG. 7 is a perspective assembly view of FIG. 6.

Referring to FIGS. 6 and 7, the front handle 1 comprises a shank 12 and a handgrip 11 at one end of the shank 12. The shank 12 has a longitudinal sliding groove 121.

Figure 4:
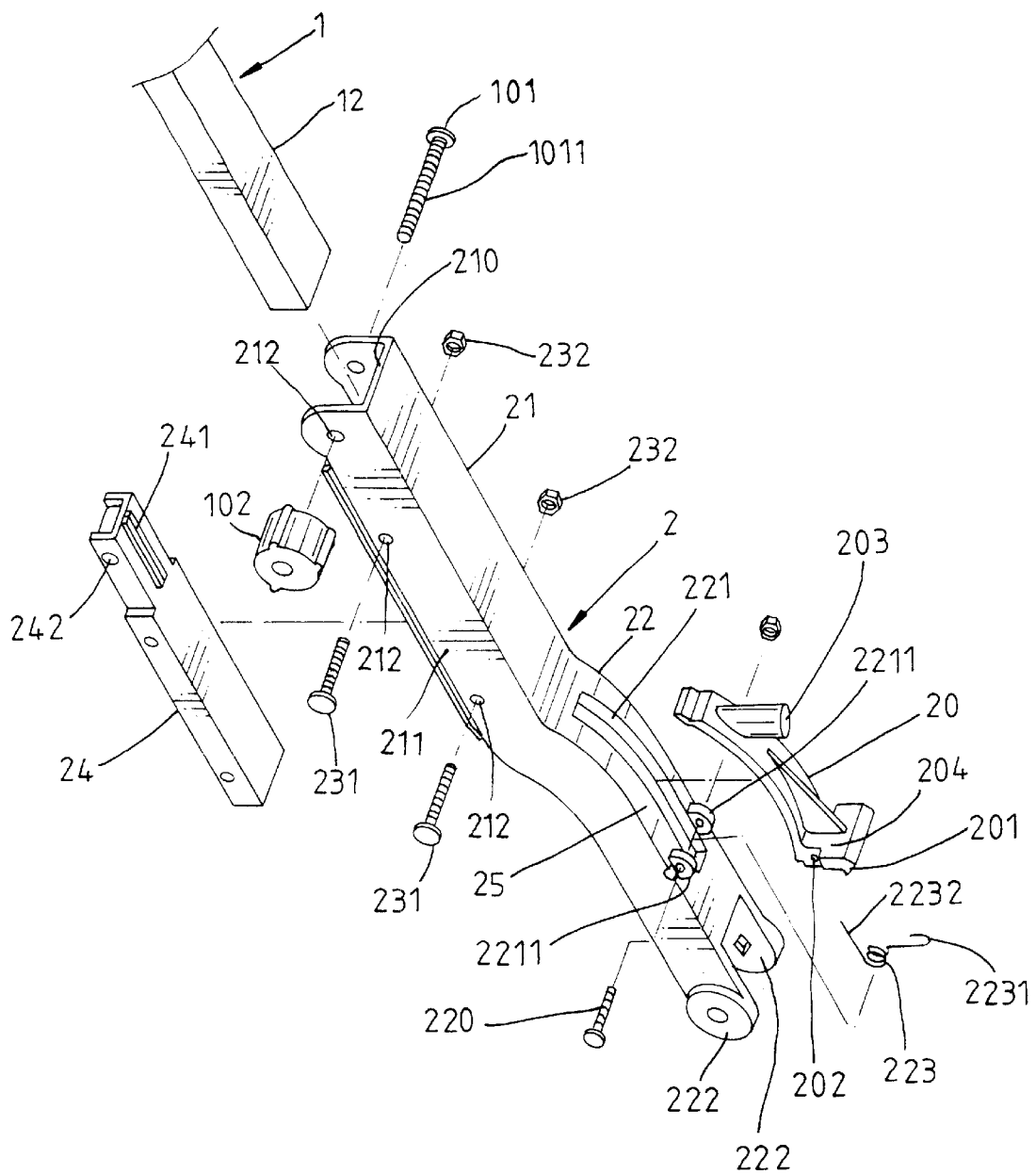
FIG. 4 is an exploded view of FIG. 2.

Referring to FIGS. 4, 6 and 7, the upper main shaft 2 comprises a hollow shaft body 21 of substantially U-shaped cross section, and a locating frame 24 fastened to the shaft body 21. The shaft body 21 and the locating frame 24 define a longitudinal sliding hole 210, which receives the shank 12 of the front handle 1, for enabling the front handle 1 to be moved in and out of the upper main shaft 2. The hollow shaft body 21 comprises two parallel side walls 211, and symmetrical pairs of through holes 212 on the side walls 211. The locating frame 24 comprises a plurality of transverse mounting holes 242 respectively connected to the through holes 212 of the shaft body 21 between the side walls 211 by screws 231 and nuts 232, and a longitudinal guide rib 241 engaged into the longitudinal sliding groove 121 of the shank 12 of the front handle 1 to guide movement of the front handle 1 relative to the upper main shaft 2. A tightening up screw 101 is inserted through one pair of through holes 212 of the shaft body 21 and one transverse mounting hole 242 of the locating frame 24, and a lock nut 102 is threaded onto the outer thread 1011 of the tightening up screw 101 to holding down the locating frame 24, the shaft body 21 and the front handle 1, prohibiting the front handle 1 from movement relative to the upper main shaft 2. The rear half 22 of the upper main shaft 2 comprises a longitudinal slot 221, two top lugs 2211 bilaterally disposed near the rear end of the longitudinal slot 221, and a forked rear coupling end 222 pivoted to one end of the lower main shaft 4 by a pivot 44 (see also FIG. 9). A pivot 220 is fastened to the top lugs 2211 to hold a torsional spring 223. The torsional spring 223 has one end 2231 stopped at a part 25 of the rear half 22 of the upper main shaft 2, and an opposite end 2232 stopped at a part 204 of the locking frame 20.

Referring to FIGS. 2, 4, 6 and 7, the locking frame 20 comprises a hook 201 disposed at the rear end thereof and adapted for hooking the upper golf bag cradle 31, a press rod 203 disposed near the front end thereof and adapted for pressing by hand, and pivot rod 202 transversely disposed near the rear end and pivotally connected to one end of the longitudinal slot 221.

Figure 9:
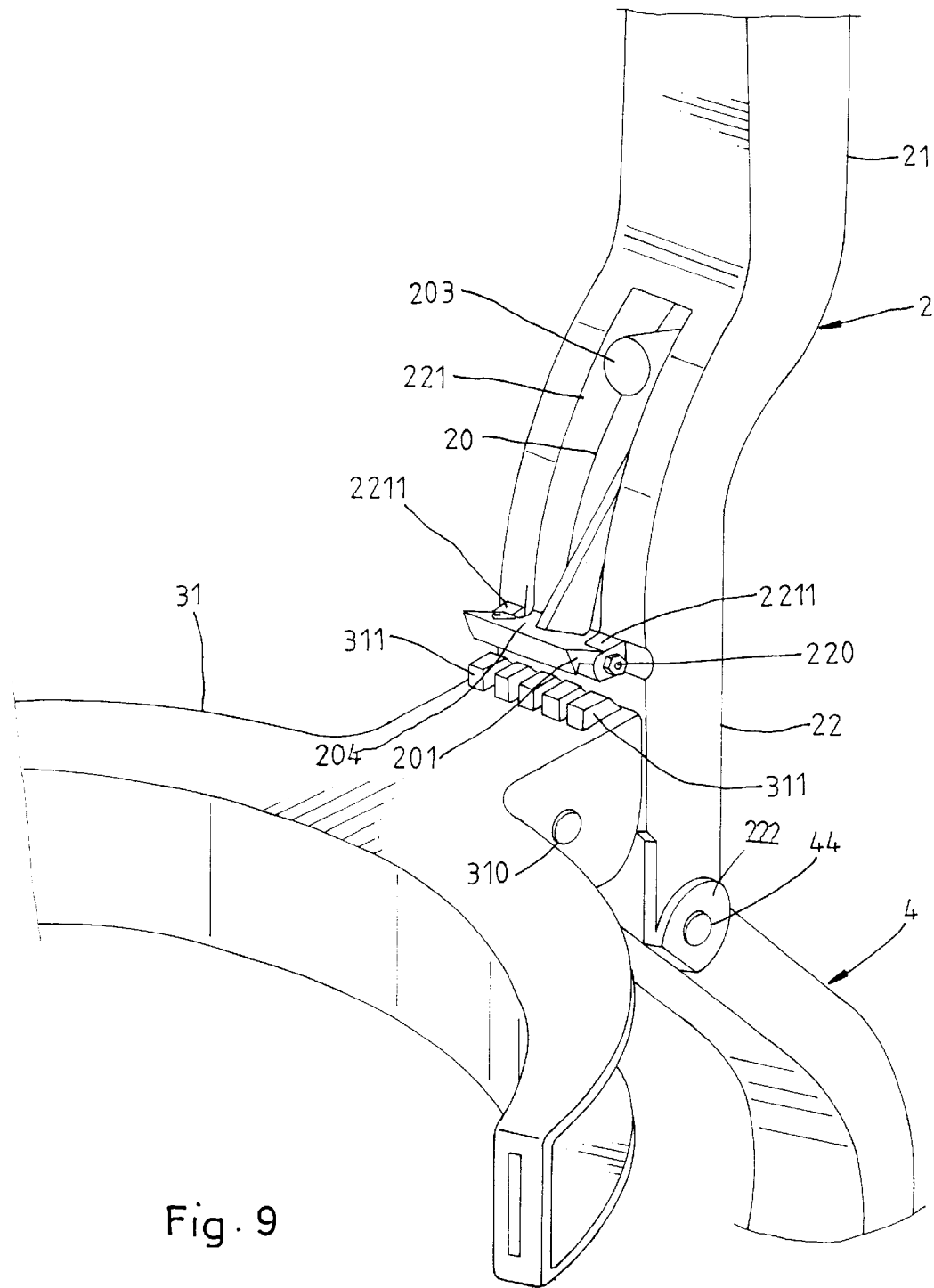
FIG. 9 is a perspective view in an enlarged scale of a part of the present invention, showing the positioning of the upper golf bag cradle on the upper main shaft.

Referring to FIG. 9, the upper golf bag cradle 31 is fixedly fastened to the front (top) end of the lower main shaft 4 by a fastening element 310, having a row of teeth 311 disposed at the front side thereof for engagement with the hook 201 of the locking frame 20.

Figure 5:
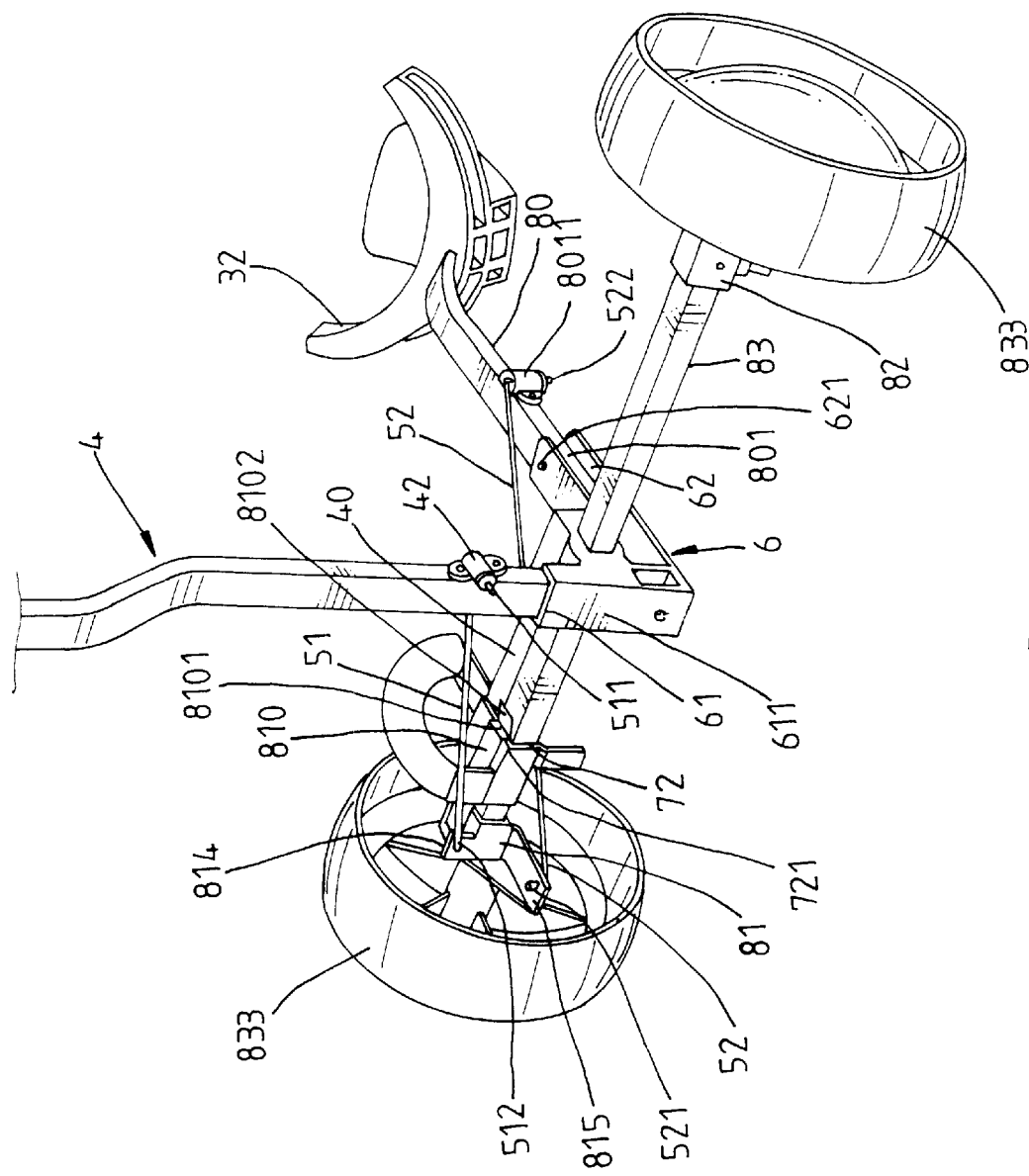
FIG. 5 is an oblique rear elevation of a part of the present invention.

Referring to FIGS. 5 and 9, the lower main shaft 4 has its front end pivoted to the pivot 44 at the forked rear coupling end 222 of the upper main shaft 2, and its bottom end connected to the coupling block 6. Further, the lower main shaft 4 comprises a holder plate 42 fixedly disposed near the rear end and adapted to hold one end of the upper link 51.

Figure 2:
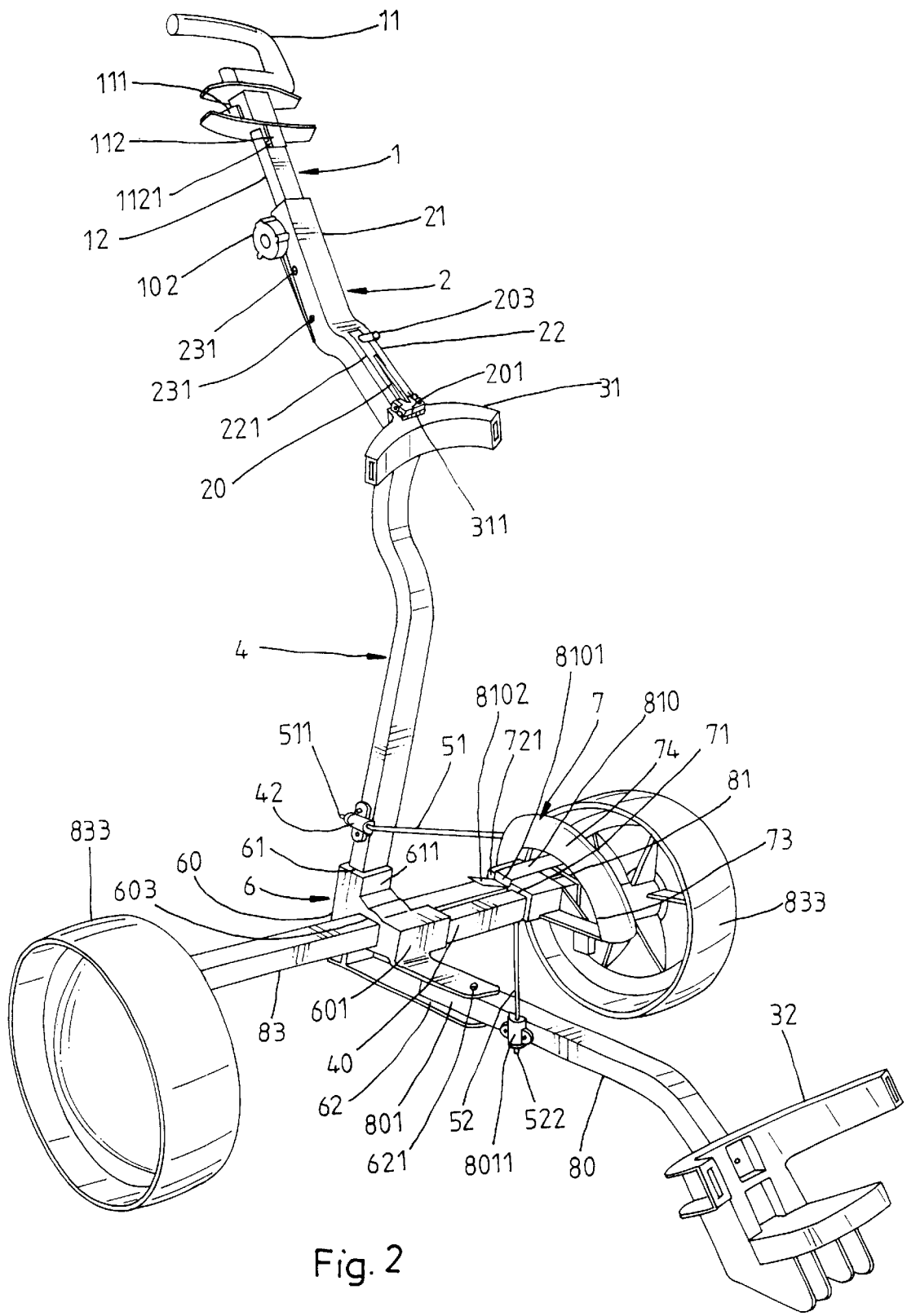
FIG. 2 is a perspective view of a folding collapsible golf cart according to the present invention.
Figure 3:
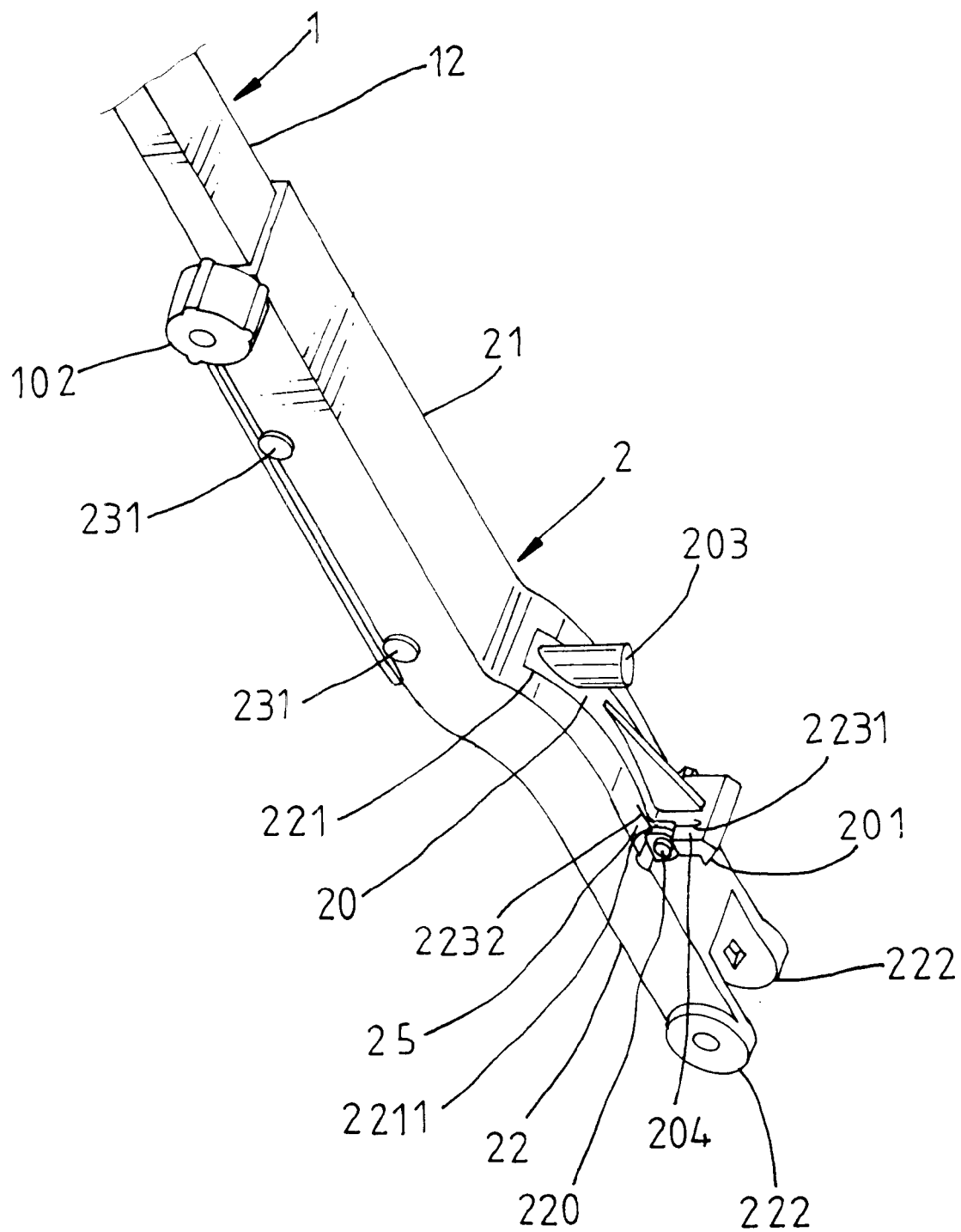
FIG. 3 is a perspective view of a part of the present invention.

Referring to FIGS. 2 and 5, the upper link 51 has a first end 511 pivoted to the holder plate 42 at the lower main shaft 4, and a second end 512 pivoted to the first wheel holder 81.

Figure 8:
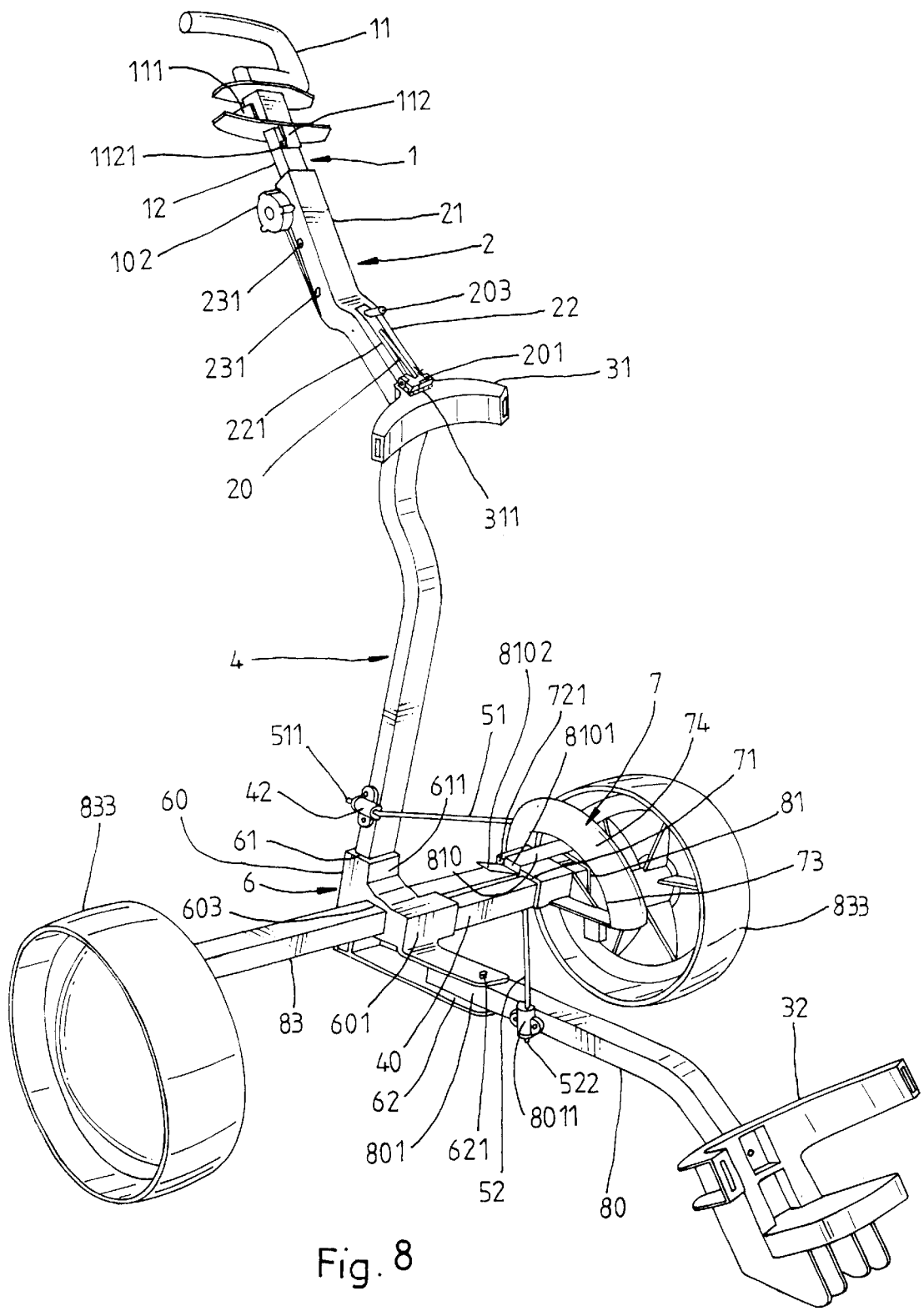
FIG. 8 is a perspective view of the folding collapsible golf cart, showing the handle received.

Referring to FIGS. 5 and 8, the coupling block 6 comprises a body 60. The body 60 of the coupling block 6 comprises an insertion hole 603 transversely disposed on the middle and adapted to receive the wheel shaft 83, a first coupling portion 61 disposed at the front one end 611 and connected to the rear end of the lower main shaft 4, a second coupling portion 62 disposed at the rear end and pivoted to the bottom main shaft 80 by a pivot 621, and a third coupling portion 601 disposed on the middle adjacent to the insertion hole 603 and connected to one end of the frame bar 40.

Referring to FIGS. 2, 5 and 8, the wheel shaft 83 is inserted through the insertion hole 603 of the coupling block 6, having one end fixedly connected to the first wheel holder 81, and an opposite end fixedly connected to the second wheel holder 82.

Referring to FIGS. 2, 5 and 8, the frame bar 40 is disposed in parallel to the wheel shaft 83, having one end connected to the third coupling portion 601 of the coupling block 6 and an opposite end connected to the carrying handle 7.

Referring to FIGS. 2, 5 and 8, the carrying handle 7 comprises a coupling hole 71, which receives one end of the frame bar 40, an insertion hole 72 for the passing of the wheel shaft 83, and an opening 73 defining a handgrip 74.

Figure 13:
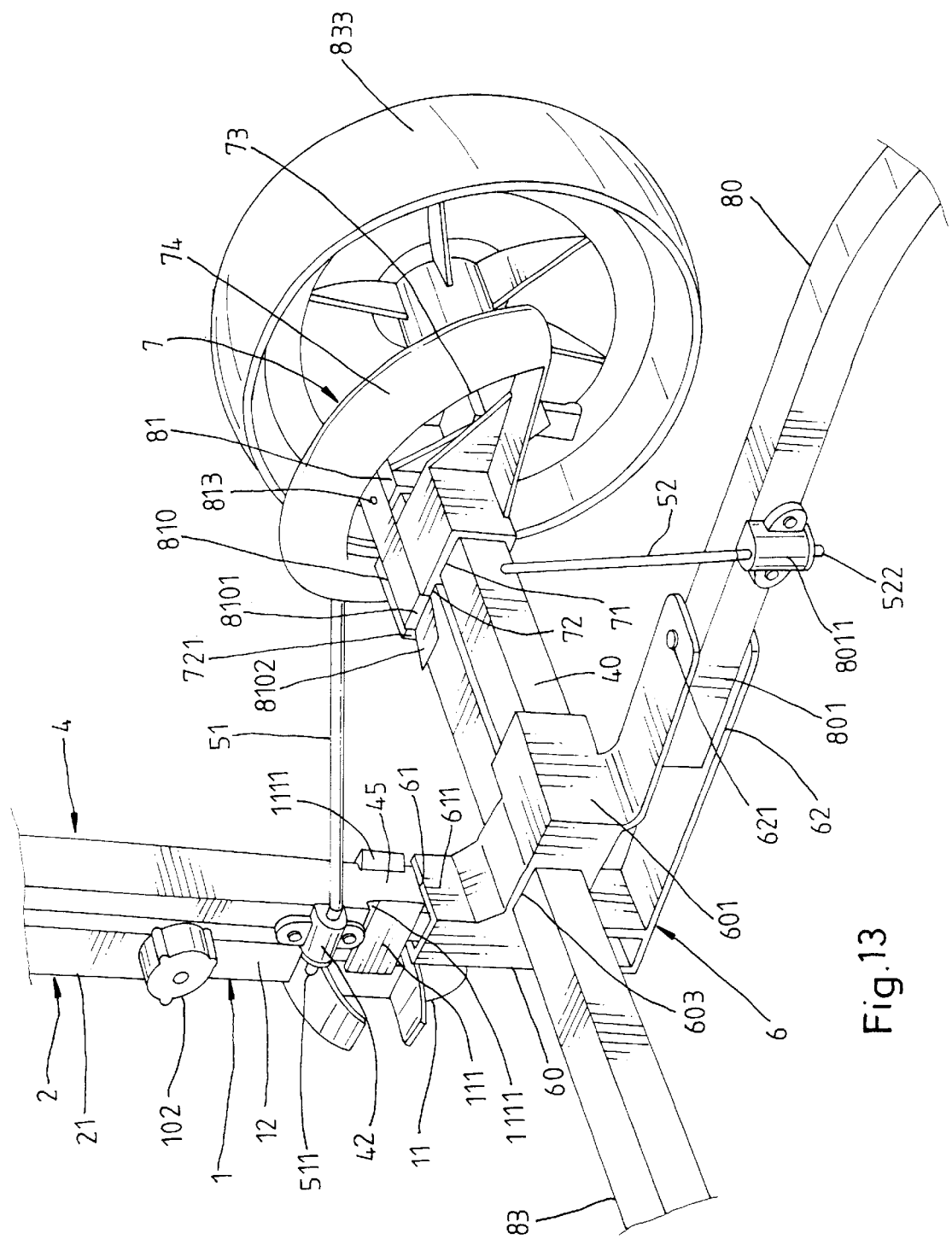
FIG. 13 is an enlarged view of a part of FIG. 12.

Referring to FIGS. 5 and 13, the first wheel holder 81 is fixedly fastened to one end of the wheel shaft 83, having a first coupling portion 814 coupled to the second end 512 of the upper link 51, a second coupling portion 815 coupled to one end of the lower link 52, an a metal spring hook plate 810 fixedly secured thereto by a fastening element 813. The metal spring hook plate 810 has one end fixedly fastened to the first wheel holder 81 and an opposite end terminating in a hooked portion 8101 and then a finger strip 8102 curved upwards. The hooked portion 8101 of the metal spring hook plate 810 is hooked on a part of the top peripheral wall 721 of the insertion hole 72 of the carrying handle 7.

Referring to FIGS. 2 and 5, the second wheel holder 82 is fixedly fastened to one end of the wheel shaft 83 remote from the first wheel holder 81. Further, the first wheel holder 81 and the second wheel holder 82 hold a respective wheel 833.

Referring to FIGS. 2 and 5, the lower link 52 has a first end 521 pivoted to the second coupling portion 815 of the first wheel holder 81, and a second end 522 pivoted to the bottom main shaft 80.

Referring to FIGS. 2 and 5, the bottom main shaft 80 has a front end 801 pivoted to the pivot 621 at the second coupling portion 62 of the coupling block 6, a holder plate 8011 disposed near the front end 801 and coupled to the second end 522 of the lower link 52.

Referring to FIGS. 2 and 5, the lower golf bag cradle 32 is fixedly fastened to one end, namely, the rear end of the bottom main shaft 80 remove from the coupling block 6.

Figure 10:
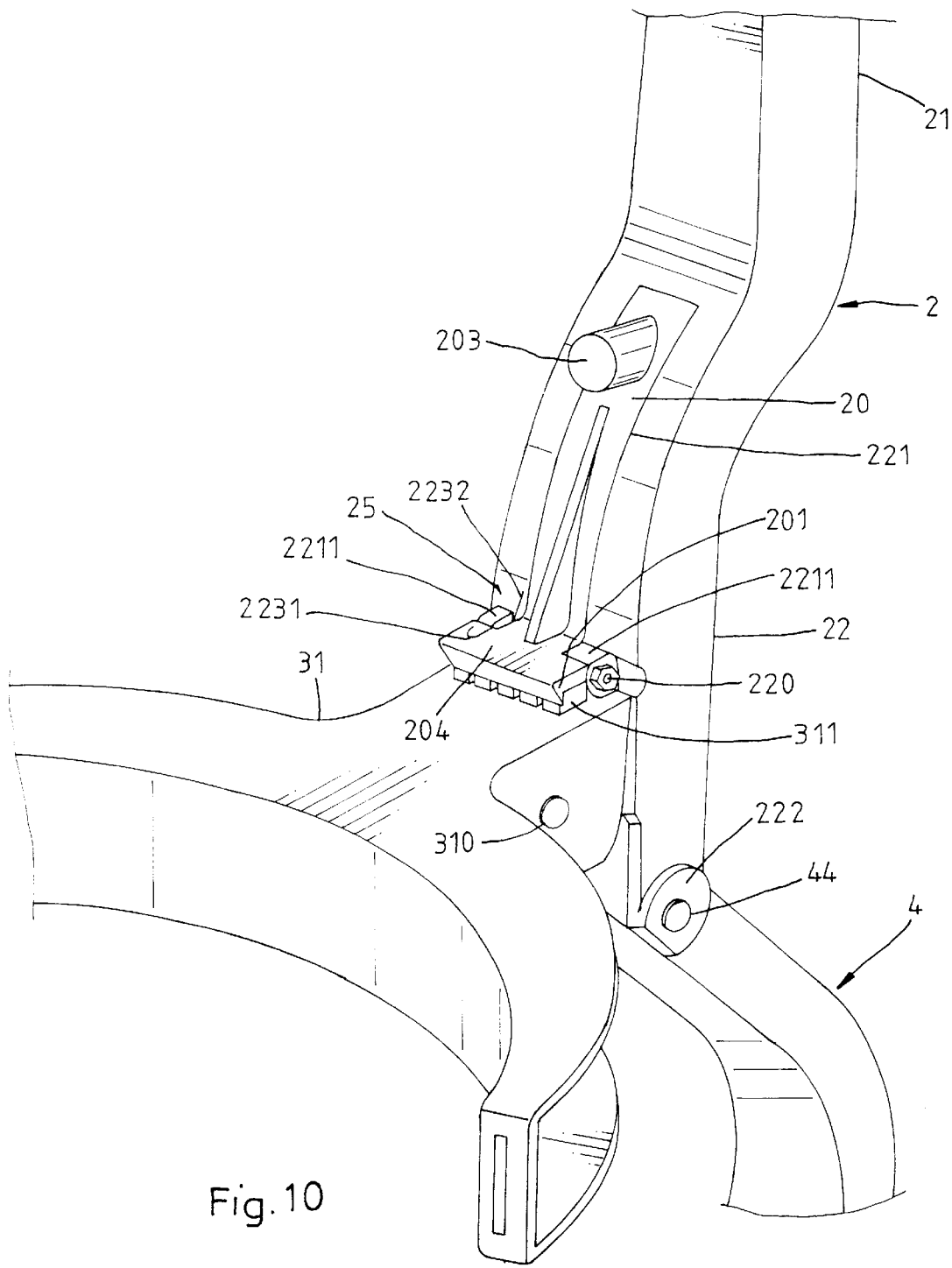
FIG. 10 is similar to FIG. 9 but showing the locking frame depressed.
Figure 11:
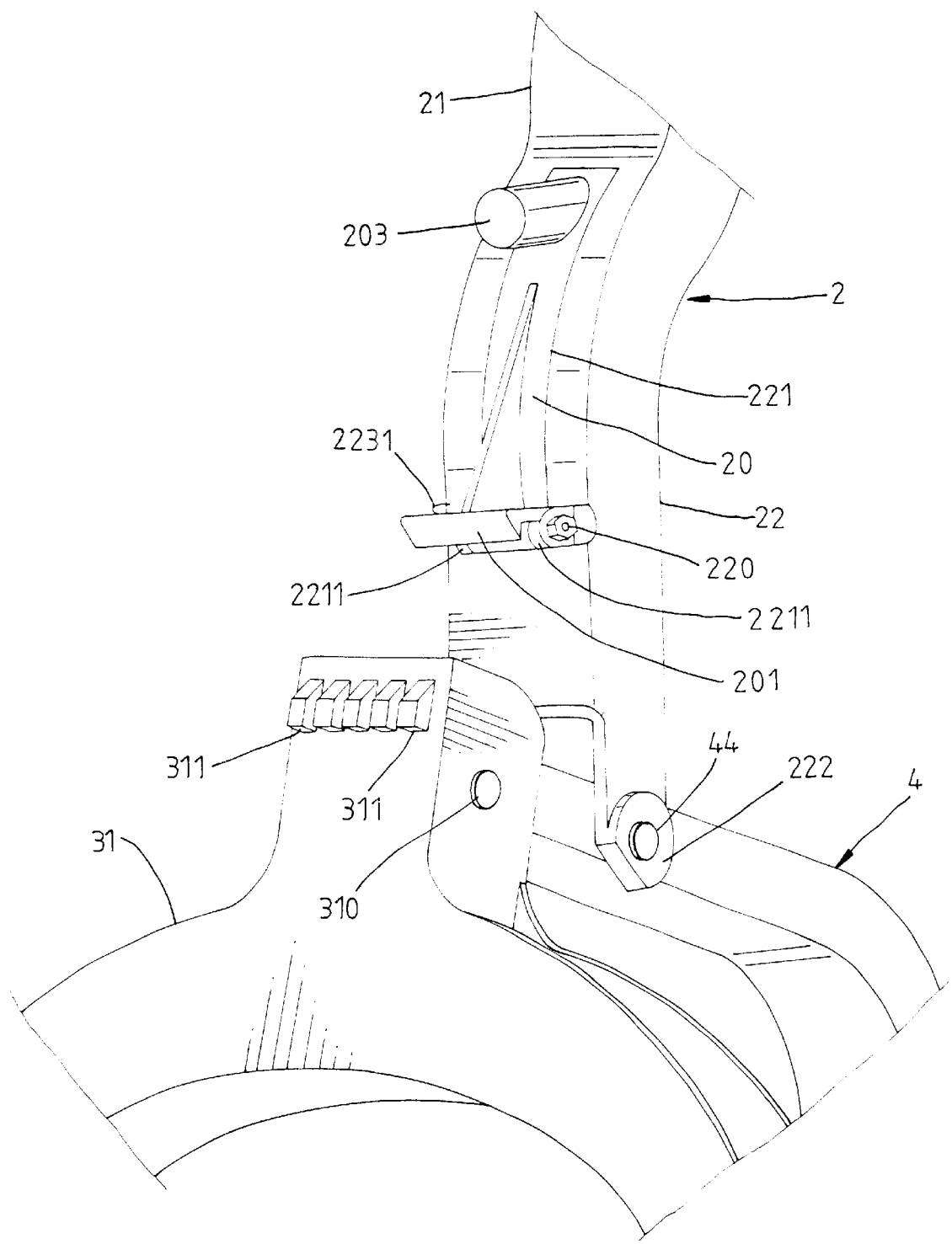
FIG. 11 is similar to FIG. 10 but showing the locking frame disengaged from the upper golf bag cradle, the upper main shaft turned backwards.
Figure 14:
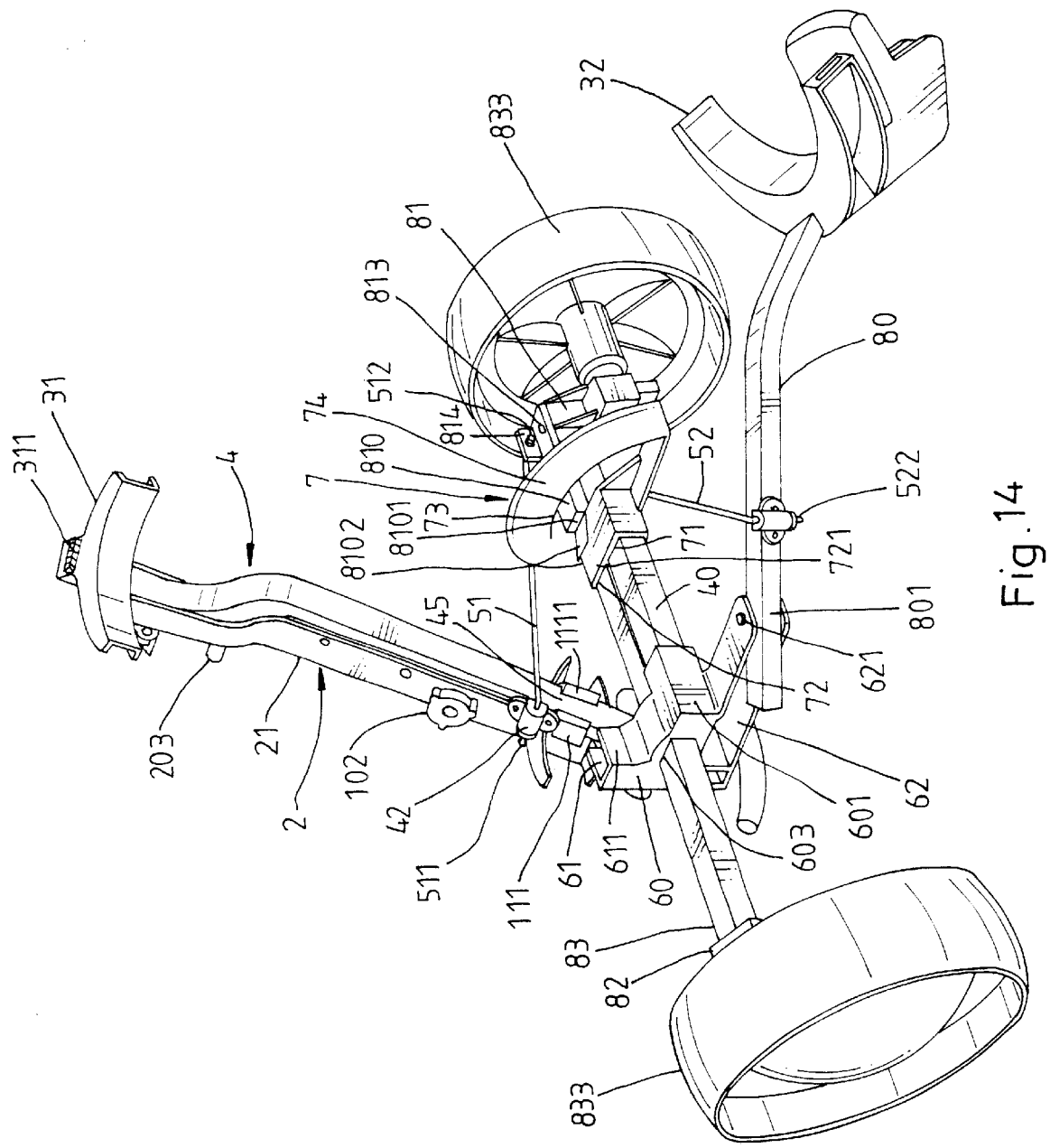
FIG. 14 is a perspective view of the present invention showing another folding status of the folding collapsible golf cart.
Figure 15:
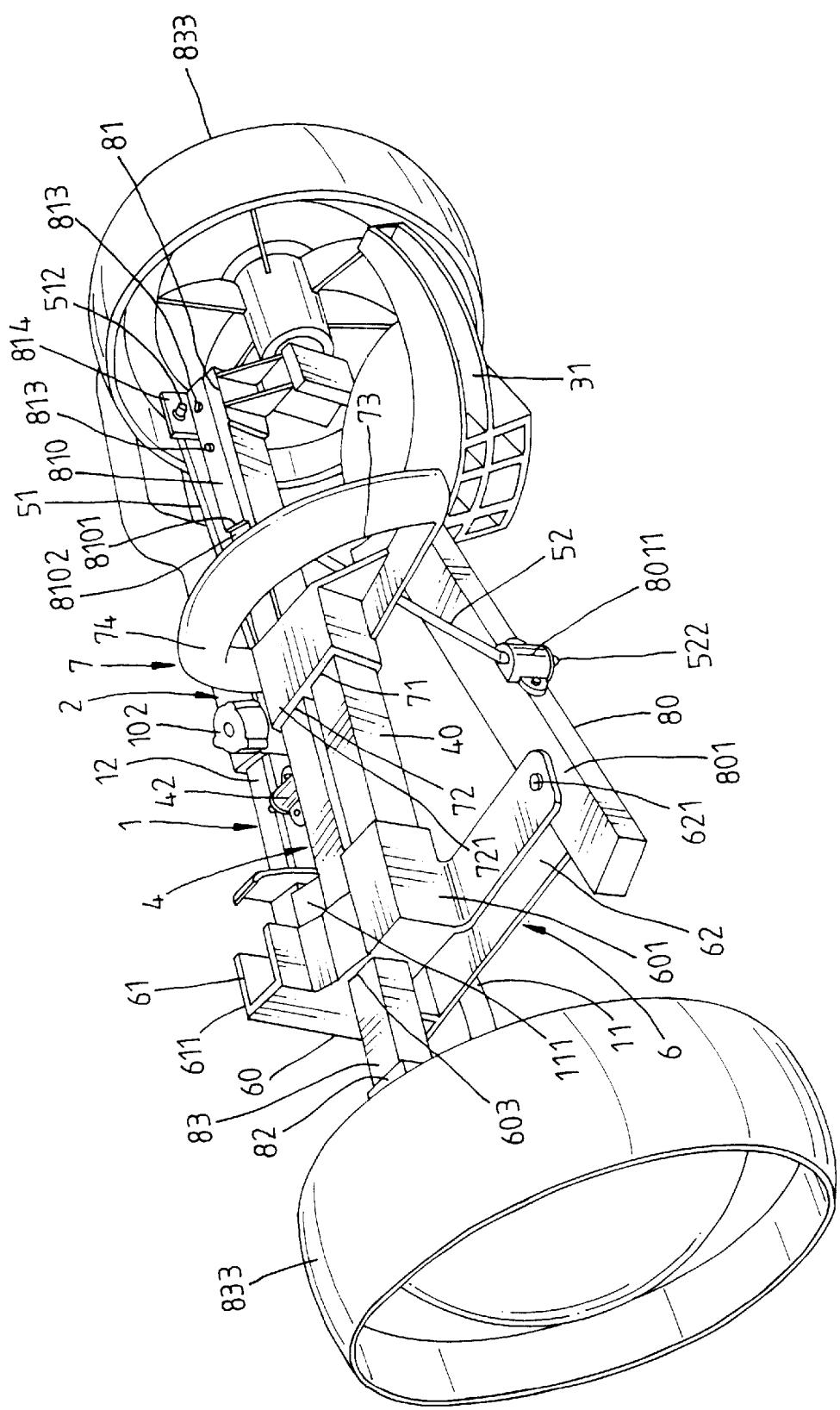
FIG. 15 is a perspective view of the present invention showing the folding collapsible golf cart completely folded up.

Referring to Figures from 8 through 15, when collapsing the folding collapsible golf cart, the lock nut 102 is loosened from tightening up screw 101 to unlock the front handle 1, enabling the front handle 1 to be pushed back and inserted into the end of the longitudinal sliding hole 210 of the upper main shaft 2, and then the lock nut 102 is fastened tight to lock the front handle 1 in the received position (see FIG. 8), and then the press rod 203 of the locking frame 20 is depressed to disengage the hook 201 from the teeth 311 of the upper golf bag cradle 31 (see FIG. 10), and then the upper main shaft 2 is turned downwards (see FIG. 11) and closely attached to the lower main shaft 4 (see FIGS. 12 and 13), and then the finger strip 8102 of the metal spring hook plate 810 is pulled upwards with the fingers to disengage the hooked portion 8101 of the metal spring hook plate 810 from the top peripheral wall 721 of the insertion hole 72 of the carrying handle 7, and then the lower main shaft 4 and the collapsed upper main shaft 2 are turned downwards in direction toward the first wheel holder 81, causing the upper link 51 to move the coupling block 6 and the carrying handle 7 toward the second wheel holder 82 and the lower link 52 to move the bottom main shaft 80 and the lower golf bag cradle 32 toward the first wheel holder 81 to simultaneously achieve X Y, Z three-direction folding action (see FIG. 14). When collapsed, the upper main shaft 2, the lower main shaft 4 and the wheel shaft 83 are substantially kept in parallel, the bottom main shaft 80, the lower golf bag cradle 32, the coupling block 6 and the carrying handle 7 are kept between the wheels 833 (see FIG. 15). Therefore, the dimension of the folding collapsible golf cart is greatly reduced when collapsed. Through the handgrip 74 of the carrying handle 7, the collapsed condition of the folding collapsible golf cart can conveniently be carried by hand. When reversing the aforesaid procedure, the folding collapsible golf cart is extended from the collapsed position shown in FIG. 15 to the extended operative position shown in FIG. 2. Further, because the finger strip 8102 curves upwards, the metal spring hook plate 810 does not hinder the movement of the carrying handle 7 when extending the folding collapsible golf cart from the collapsed position to the extended operative position.

Figure 12:
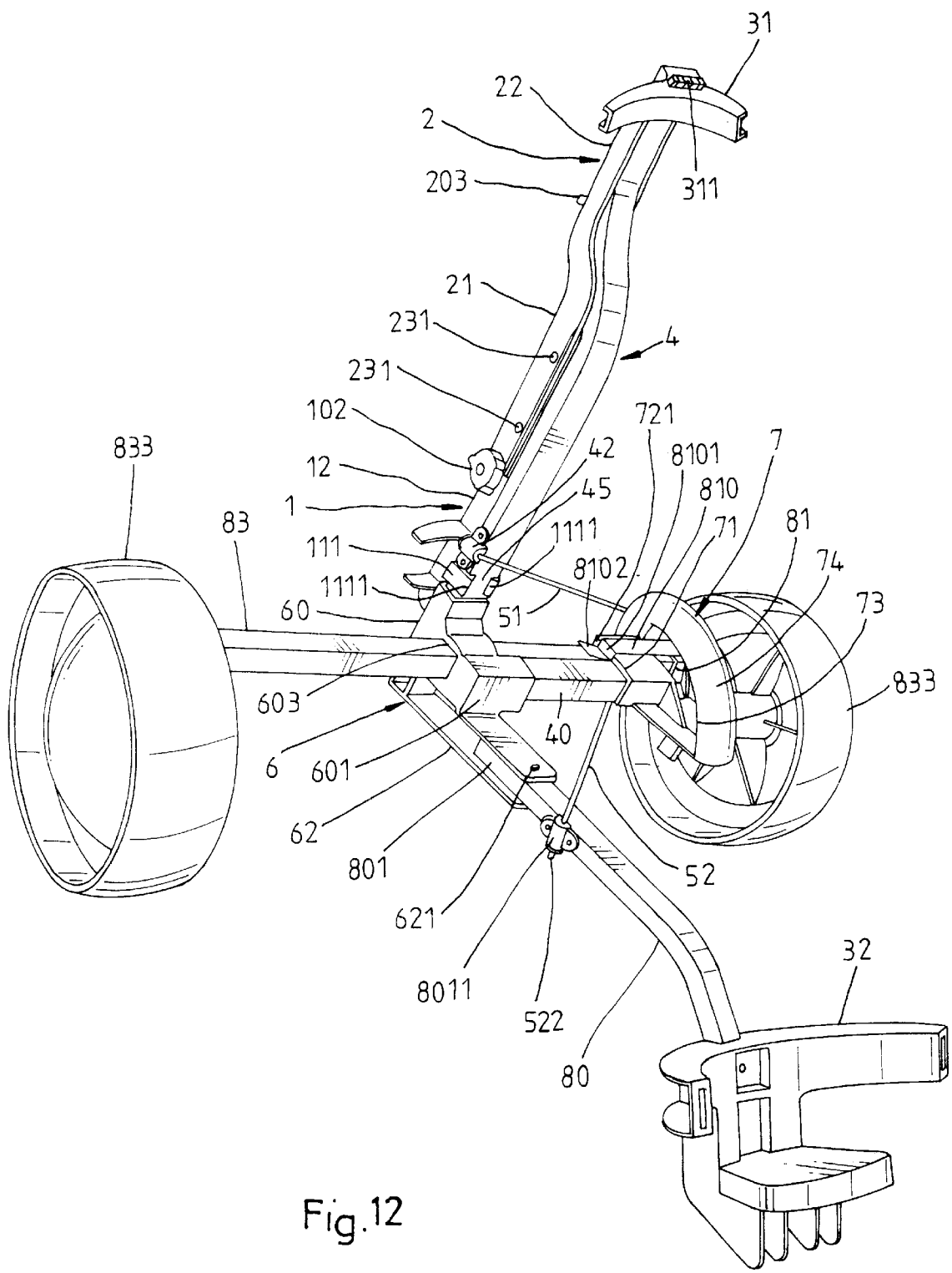
FIG. 12 is a perspective view of the present invention showing one folding status of the folding collapsible golf cart.

Referring to FIGS. 6, 12 and 13, the front handle 1 comprises two parallel spring plates 111 disposed at two sides of the connecting area between the handgrip 11 and the shank 12, each spring plate 111 having a hooked portion 1111. When turning the upper main shaft 2 downwards and attaching the upper main shaft 2 to the lower main shaft 4, the hooked portions 1111 of the spring plates 111 are forced to hook on the shaft body 45 of the lower main shaft 4 to hold the upper main shaft 2 in the collapsed position. The handle 1 further comprises a clip 112. The clip 112 has a flanged free end 1121 adapted to hold down sheets of paper on the shank 12 of the front handle 1.

As indicated above, the upper link 51 and the lower link 52 are forced to move the coupling block 6 and the carrying handle 7 toward the second wheel holder 82 and the bottom main shaft 80 and the lower golf bag cradle 32 toward the first wheel holder 81 to simultaneously achieve X, Y, Z three-direction folding action when turning the upper main shaft 2 downwards toward the lower main shaft 4 after disengaging the locking frame 20 from the teeth 311 of the upper golf bag cradle 31. When collapsed, the spring plates 111 of the front handle 1 are hooked on the shaft body 45 of the lower main shaft 4 to hold the golf cart positively in the collapsed position, so that the user can conveniently carry the collapsed golf cart by hand through the handgrip 74 of the carrying handle 7. Further, the clip 112 enables the user to secure sheets of paper to the shank 12 of the front handle 1 for making notes or recording scores.

What is claimed is:

1. A folding collapsible golf bag cart comprising:

an upper main shaft, said upper main shaft comprising a hollow shaft body of substantially U-shaped cross section, a locating frame fastened to said shaft body, and a longitudinal sliding hole defined between said shaft body and said locating frame, said shaft body comprising a longitudinal slot, two top lugs bilaterally disposed near a rear end of said longitudinal slot, a pivot connected between said top lugs, and a forked rear coupling end, said locating frame comprising a longitudinal guide rib;

a front handle moved in and out of said upper main shaft, said front handle comprising a shank inserted into the longitudinal sliding hold of said upper main shaft and a handgrip extended from said shank and disposed outside said upper main shaft, said shank having a longitudinal sliding groove, which receives the longitudinal guide rib of said locating frame;

a tightening-up screw and lock nut set installed in said upper main shaft and adapted to lock said front handle;

a lower main shaft, said lower main shaft comprising a top end pivoted to the forked rear coupling end of the shaft body of said upper main shaft by pivot means, a bottom end connected to a coupling block, and a holder plate fixedly disposed near the bottom end and adapted to hold one end of an upper link;

an upper golf bag cradle fixedly fastened to the top end of said lower main shaft said upper golf bag cradle having a row of teeth disposed at a front side thereof;

a locking frame pivoted to said one end of the longitudinal slot of said upper main shaft, said locking frame comprising a hook disposed at a bottom end thereof and adapted for hooking on the teeth of said upper gold bag cradle, a press rod disposed near a top end thereof and adapted for pressing by hand to disengage the hook of said locking frame from the teeth of said upper golf bag cradle;

spring means mounted on the pivot between the top lugs of said upper main shaft and connected between the shaft body of said upper main shaft and the bottom end of said locking frame and adapted to force said locking frame into engagement with the teeth of said upper golf bag cradle;

said upper link having a first end pivoted to the holder plate at said lower main shaft and a second end;

said coupling block comprising an insertion hole transversely disposed in the middle, a first coupling portion disposed at a rear end thereof and pivoted to the bottom end of said lower main shaft, a second coupling portion disposed at a front end thereof, and a third coupling portion disposed on the middle adjacent to said insertion hole;

a wheel shaft inserted through the insertion hole of said coupling block, said wheel shaft having a first end a second end;

a frame bar disposed in parallel to said wheel shaft, said frame bar having a first end connected to the third coupling portion of said coupling block, and a second end;

a carrying handle, said carrying handle comprising a coupling hole connected to the second end of said frame bar, an insertion hole for the passing of said wheel shaft, and an opening defining a handgrip;

a first wheel hold fixedly fastened to the first end of said wheel shaft, said first wheel holder comprising a first coupling portion coupled to the second end of said upper link, a second coupling portion, and a metal spring hook plate fixedly secured thereto by a fastening element, said metal spring hook plate comprising a hooked portion hooked on a part of said carrying handle, and a finger strip adapted for pulling by hand to disengage the hooked portion of said metal spring hook plate from said carrying handle;

a second wheel holder fixedly fastened to the second end of said wheel shaft;

a first wheel and a second wheel respectively mounted on said first wheel holder and said second wheel holder;

a lower link, said lower link having a first end pivoted to the second coupling portion of said first wheel holder, and a second end;

a bottom main shaft, said bottom main shaft comprising a front end pivoted to the second coupling portion of said coupling block, a rear end, and a holder plate disposed near the front end of said bottom main shaft and pivoted to the second end of said lower link: and a lower golf bag cradle fixedly mounted on the bottom end of said bottom main shaft.

2. The folding collapsible golf cart of claim 1, wherein said front handle comprises two parallel spring plates, said parallel spring plates each having a hooked portion adapted to hook on said lower main shaft to hold said upper main shaft in a collapsed position said upper main shaft is turned downwards toward said lower main shaft after said tightening up screw and nut set has been loosened and said press rod of said locking frame has been depressed to disengage the a hook of said locking from the teeth of said upper golf bag cradle.

3. The folding collapsible golf cart of claim 1, wherein said front handle comprises a clip adapted to hold down sheets of paper on the shank of said front handle.

* * * * *